E. J. LOBDELL.
COMBINED SAW AND JOINTER.
APPLICATION FILED JUNE 24, 1916.
1,213,512.
Patented Jan. 23, 1917.
5 SHEETS—SHEET 4.
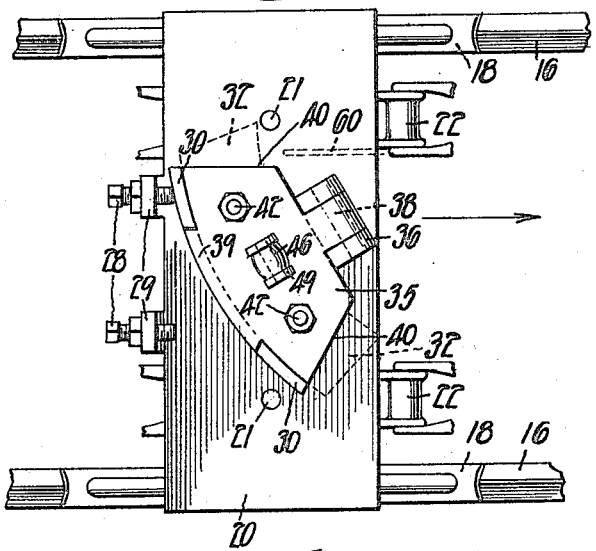
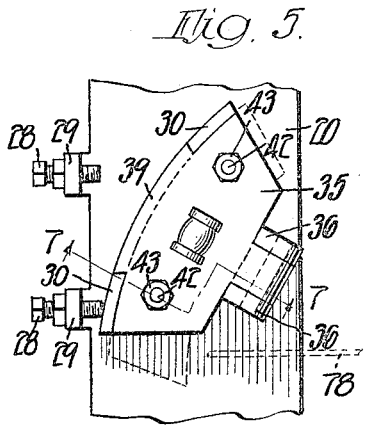
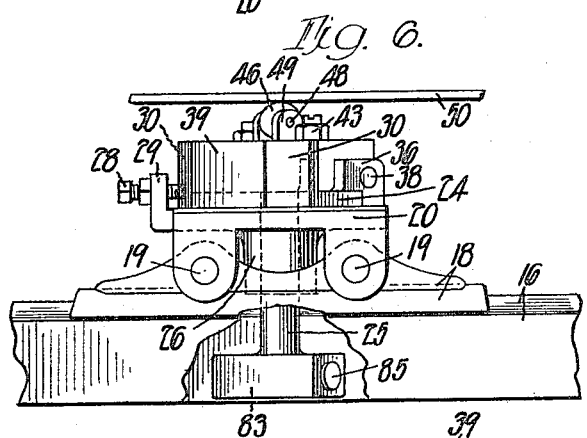
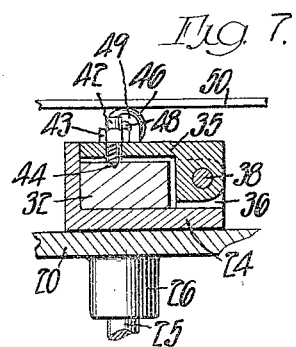
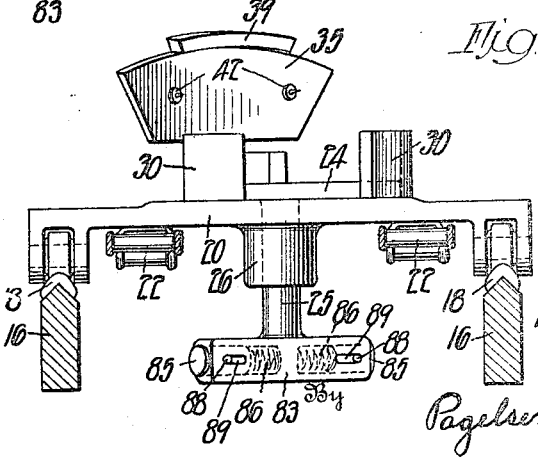
Inventor
Edward J. Lobdell,
Witness

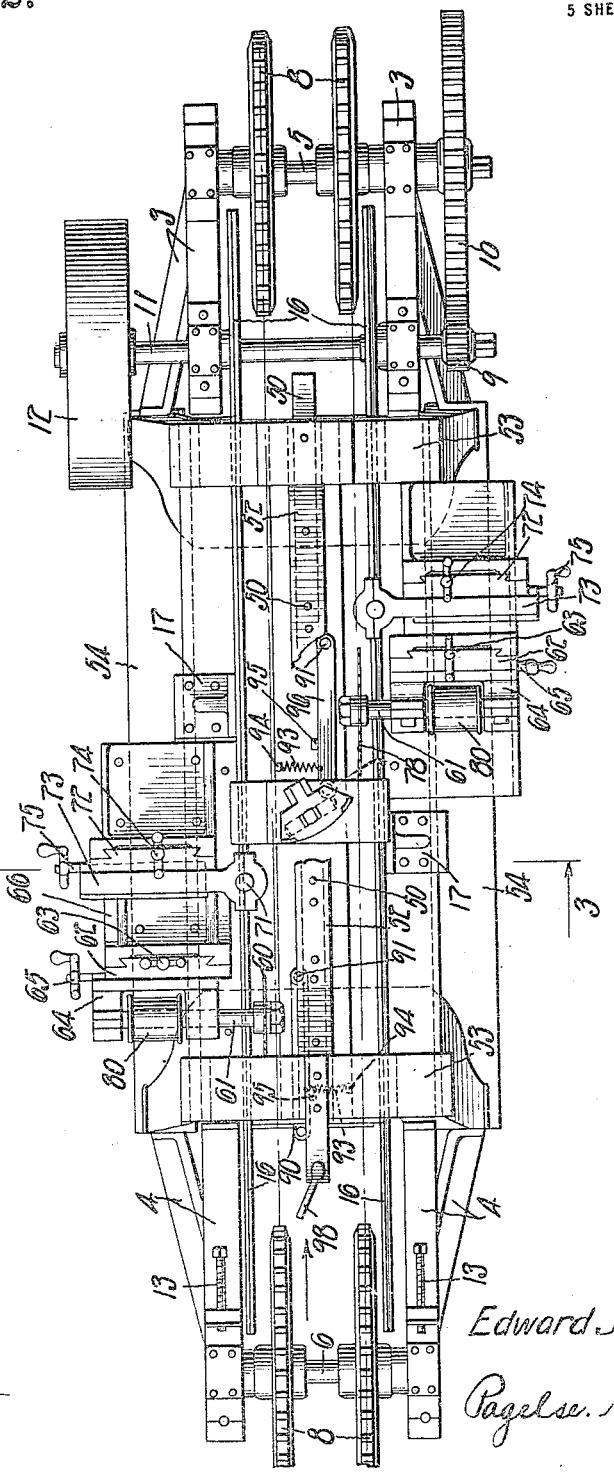

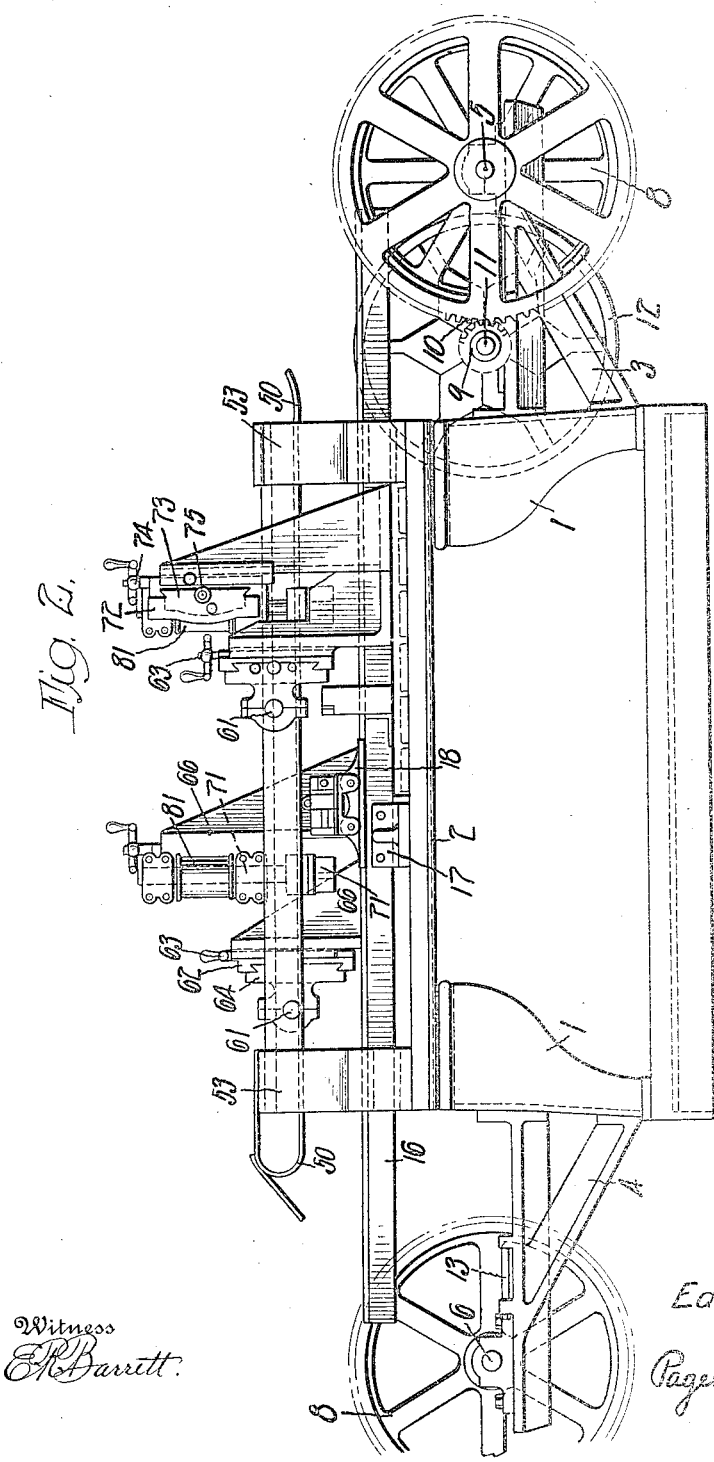

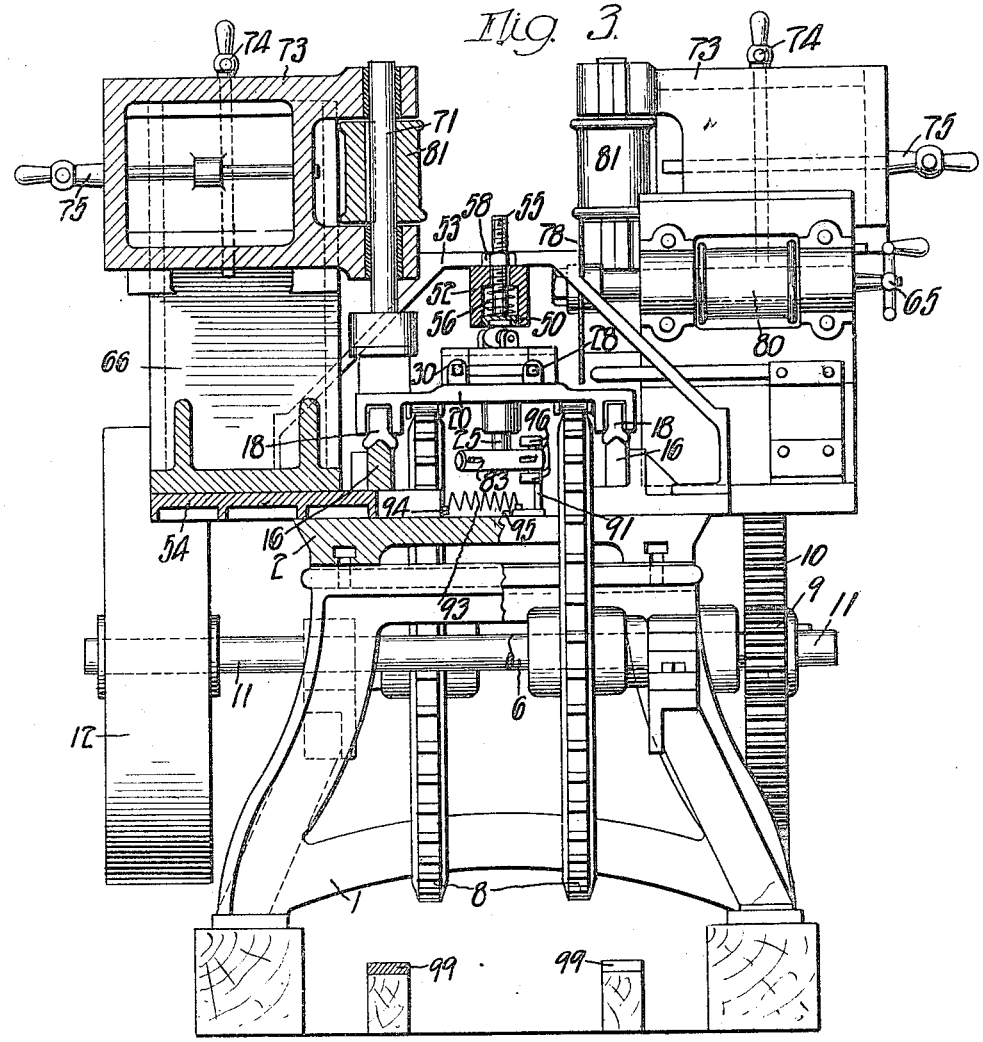

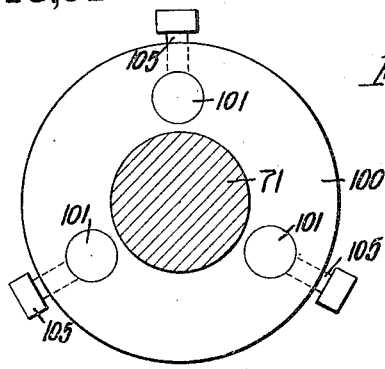
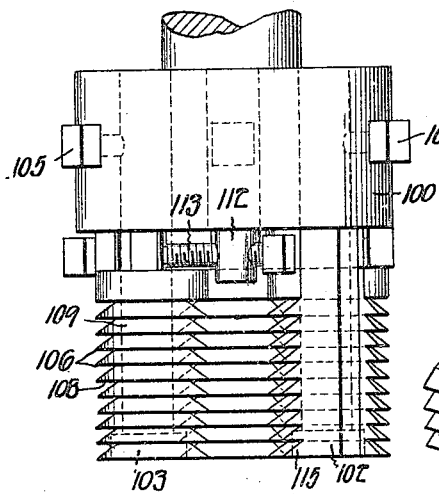
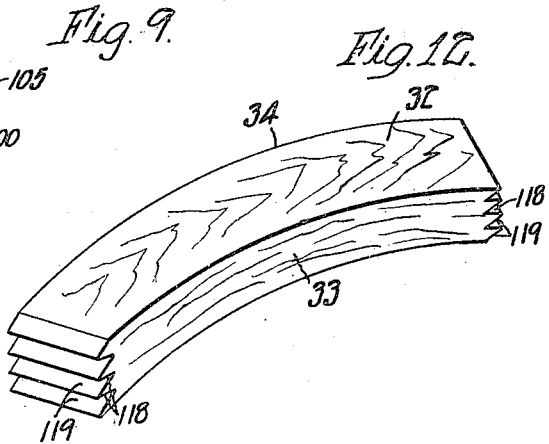
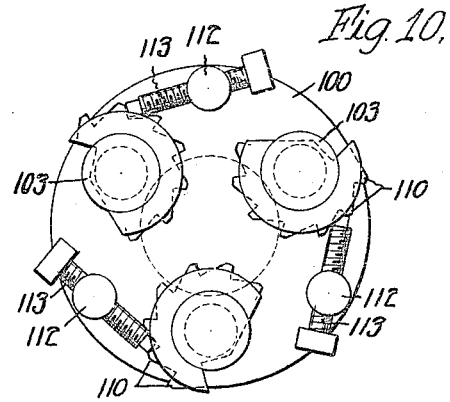
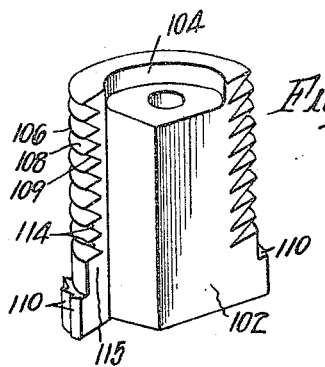

UNITED STATES PATENT OFFICE.

EDWARD J. LOBDELL, OF ONAWAY, MICHIGAN.

COMBINED SAW AND JOINTER.

1,213,512.  Specification of Letters Patent.  Patented Jan. 23, 1917.

Application filed June 24, 1916. Serial No. 105,580.

*To all whom it may concern:*

Be it known that I, EDWARD J. LOBDELL, a citizen of the United States, and residing at Onaway, in the county of Presque Isle and State of Michigan, have invented a new and Improved Combined Saw and Jointer, of which the following is a specification.

The present invention has reference to a machine for forming curved sections of a wood rim such as is used in steering wheels for motor vehicles; and its object is to provide means whereby the ends of the section blocks are trimmed or sawed radially and whereby the end surfaces thus formed are grooved or jointed in such manner as to afford proper gluing surfaces for connection to adjacent sections.

Among the important features of the invention are: means for presenting the blocks at such an angle to a saw as to cause them to be cut or trimmed radially at one end with respect to the finished rim, and afterward, (and without removing the blocks from the carrier) presenting the other end of the block in similar manner to another saw whereby it also is trimmed or cut at an angle to the plane of the first mentioned end; means for cutting radial grooves in the trimmed end faces of the blocks without removing the blocks from the machine; a carrier, a saw and a jointer located at one side of the path of the carrier, a saw and a jointer located at the other side of the path of the carrier, and means whereby the carrier is reversed in position to cause the tools on the one side to operate on the block in a plane at an angle to that in which those on the other side operate; means for conveniently holding the clamps on the carrier closed during the sawing and cutting operations and allowing them to afterward automatically open and discharge the blocks; also in the combination of the carriers with jointing cutters of such nature that one wall of the grooves cut in the ends of the blocks is parallel to the grain of the wood. The invention further consists in the details of construction shown, described and claimed.

In the drawings, Figure 1 is a plan view of a machine showing a preferred embodiment of my invention. Fig. 2 is a side elevation corresponding thereto. Fig. 3 is a part end view, part section on the line 3—3 of Fig. 1. Fig. 4 is a plan view showing one of the carriers and adjacent elements. Fig. 5 is a similar view, the block holder being reversed. Fig. 6 is a side elevation corresponding to Fig. 1, parts being broken away. Fig. 7 is a section on the line 7—7 of Fig. 5. Fig. 8 is a view looking from the left in Fig. 4, the clamping jaw being elevated. Fig. 9 is a side view of a preferred form of jointer, parts being broken away. Fig. 10 is a bottom plan view corresponding thereto. Fig. 11 is a top plan view. Fig. 12 is a perspective view of one of the finished blocks showing both the joints and the direction of the grain of the wood. Fig. 13 is a perspective view of a cutter.

The bed of the machine preferably includes cross frames 1 and a bed plate 2 which may be bolted or otherwise connected to one another, together with brackets 3 and 4 that project from the front and rear cross frames and afford support, respectively, for the driven shaft 5 and the idler shaft 6. Each of these shafts has mounted thereon two spaced sprocket wheels 8; and the driven shaft may receive its power through the gears 9 and 10, shaft 11 and pulley 12. Bolts 13 or other means suitable for adjusting the idler shaft in respect to the frame may be provided.

Supported on the bed frame in any desired way, for example, by means of the brackets 17, are spaced track bars 16 that extend longitudinally thereof near the upper sides of the sprocket wheels—the upper surfaces of these tracks are preferably of V shape (the vertex being upward), as shown, and receive correspondingly grooved carrier slides 18 that are pin connected at 19 to carrier plates or bases 20 which may be riveted or bolted at 21 to the sprocket chains 22 which pass over the wheels 8. Clamp bases 24 having vertical pivots 25 rest on the plates 20 and extend downwardly through perforated bosses 26 thereon and are arranged to be swung horizontally into either of the positions indicated in Figs. 4 and 5, the extent of this movement being determined by screws or limit stops 28 carried by upstanding lugs 29 on the plates and preferably arranged to contact with stops or abutments 30 on the clamp bases, although the contact may be made elsewhere if desired. The abutments have another function in that they engage the rear faces of wooden blocks 32 (Fig. 7) (the ends of which are to be jointed), to afford a backing for the same as the carriers are being drawn in the direction indicated by the arrows (Figs. 1 and 4). These blocks have inner and outer concentric faces 33 and 34 and are retained in position on the clamp bases by clamp members 35 connected to lugs 36 on the corresponding clamp bases by horizontal pins 38 that are normally inclined with reference to the direction of travel of the carrier.

It will be observed that the members 35 have marginal portions 39 (Fig. 8, particularly) which extend down between the abutments when the members are in clamping position, whereby the rear faces of the blocks are more rigidly supported, and that, when the clamp base is in neutral position, that is, half way between the limit stops 28, its side edges, as well as the side edges 40 of the member 35, diverge from each other rearwardly—when the clamp base engages a limit stop, one or the other of these edges is parallel to the line of movement of the carrier. Adjustable holding-screws 42 provided with lock-nuts 43 pass through the members 35 and have their reduced sharpened ends 44 arranged to embed themselves in the upper surfaces of the blocks.

As the carriers are drawn through the machine, they are held closed by rollers 46 (preferably mounted on shafts 48 parallel to the pins 38 and supported by lugs 49 on the clamp members 35) that engage the longitudinal pressure plate 50. This plate is preferably supported in a member 52 of U-shape in cross section which, in turn, is carried on cross bars 53 that rest on the lateral extension or side plates 54 secured on the bed plate 2, although other forms of supports may, of course, be used. The pressure plate is normally suspended from the member 52 by means of bolts 55 inclosed by springs 56 whereby the plate is thrust downwardly, the limit of movement in this direction being determined by nuts 58 on the upper ends of the bolts.

One of the side plates 54 has supported thereon, near its rear end, a circular saw 60, the shaft 61 of which is carried on a slide rest comprising an elevation determining (preferably vertical) slide 62 and actuating hand screw 63, a cross slide 64 and actuating hand screw 65 of well known construction, together with a base member 66. At a point a short distance ahead of the saw, the same side plate carries a jointer 70 fixed to a vertical shaft 71 which, like the saw, is supported on a slide rest comprising the slides 72 and 73 and the feed screws 74 and 75. The other side plate constitutes a support for a similarly related saw 78 and jointer 79; the slide rests are designated by the same numerals as before—it will be noticed, however, that the saw 78 is appreciably ahead of the jointer 70. The saw and jointer shafts may be driven, respectively, through pulleys 80 and 81 from a suitable source of power (not shown).

It is obvious that various forms of cutter heads may be employed for the jointers— their function is, in any event, to cut grooves in the ends of the blocks whereby they may be matched with the grooves of other blocks to afford proper surfaces for gluing. The details of the preferred jointer will be pointed out later.

Each of the pivots 25 of the clamp bases has at its lower end an arm 83 that projects in either direction from the axis; and the end of the arm is made hollow to receive the slidable contacts 85 behind which are compression springs 86 whereby the plugs are thrust outwardly until pins 88, carried thereby, contact with the end walls of slots 89 formed in the arm. The contact at the left end of the arm (Fig. 8) is arranged to engage an alining plate 90 which is mounted to swing horizontally about a fixed pivot 91 carried by the bed plate 2, the rear end of the alining plate being provided with a spring 93 (anchored at 94) which has a tendency to draw the plate counter clockwise (Fig. 1) until it comes into engagement with a limit stop 95. It will be observed that the alining plate is so positioned as to insure engagement with the slidable contact throughout the entire time the block 32 is passing beneath the saw 60. In like manner, the opposite contact is arranged to engage an alining plate 96 while the block is passing the saw 78.

Operation of elements heretofore described:—As the chains travel forwardly and the carriers are successively presented to an operator standing at the rear end of the machine, the blocks 32 are placed upon the clamp bases, the members 35 of which are soon afterward closed and thrown around into the position indicated in Fig. 4 by contact of the member 98 (inclined downwardly and at an angle to the rear end of the pressure plate) with the clamp member 35. Further movement of the particular carrier results in contact of roller 46 with the pressure plate 50 (whereby the clamp is held closed) and an engagement of the contact 85 at the left with the alining plate 90, which holds the clamp base firmly and yet resiliently against the corresponding stop 28, thus maintaining the edge 40 substantially parallel with the line of movement of the machine, in the course of which the pivotal mounting of the alining plate and the capacity which the contact has for movement with reference to the arm in which it is seated are factors of value in that they allow proper accommodation of parts to one another. The saw therefore cuts off the end of the blocks at an angle which is determined by the adjustment of the stop 28—in other words, radially with reference to the rim of which the block is to become a part—following which the end of the block (which still projects somewhat from the clamp) passes into engagement with the cutters of the jointer 70 by which the grooves, suitable for jointing and gluing to a similar block, are formed. This completes the preparation of the one end. As the carrier continues its movement, other contact 85 comes into engagement with the alining plate 96 which throws the carriers into the position indicated in Fig. 5, whereupon the operations of sawing and jointing take place in the same general manner as before. The chain continuing its movement, the carriers pass from beneath the pressure plate, thus allowing the members 35 to swing open and discharge the finished block as the carriers pass down around the driving sprocket wheels 8. In their return movement the carriers may rest on the tracks 99.

Now referring more particularly to the jointer (Figs. 9, 10, 11 and 12):—Secured to the shaft 71 in any suitable manner is a cutter head 100 which is drilled through longitudinally at intervals around a circle struck from the axis of the shaft to receive the shanks of bolts 101 that pass through cutters 102 and have their annular heads 103 seated in recesses 104 formed in the lower ends of the latter. These bolts are preferably retained in the cutter head by radial set screws 105. The cutters 102 comprise a series of blades 106 (each of which preferably has one face 108 in a plane perpendicular to the axis of the shaft and another face 109 at an angle thereto) above which is a set of ratchet teeth 110. Threaded longitudinally into the cutter head are the blocks 112 which are perforated transversely and threaded to receive the adjusting screws 113 that are adapted to engage the ratchet teeth to turn the cutters about their axes until the cutting points 114 thereof are in proper adjustment, it being understood that the cutter head turns in the direction indicated by the arrow (Fig. 10). As the points wear away, the cutters are, of course, ground along the face 115 throughout their entire length, including the depth of the ratchet teeth, the engagement of the screws 113 for adjustment purposes being made successively with the various ratchet teeth, as is obvious. By this means use is not only made of substantially the whole cutter but accurate adjustment of the cutter points is secured throughout.

The grain of the wood runs substantially longitudinally of the blocks (Fig. 12); therefore the use of teeth having faces 108 and 109 of the character specified enables the formation of joint faces 118 and 119 which are, respectively, parallel to the grain and at an angle thereto—a relation that is of great importance since the glue adheres much betters to surfaces which are parallel to the grain than to those that extend crosswise (as both do in the ordinary V-notches).

It is clear that the broad features of the invention may be embodied in machines of detail widely different from that shown, and I do not, therefore, wish to be limited otherwise than as indicated by the subjoined claims.

I claim:—

1. A machine of the character described comprising a pair of saws and a pair of jointers, a carrier for moving a wooden block in a general direction and successively presenting it to the saws and jointers, parallel tracks upon which the carrier travels, the saws and jointers being arranged in the order of saw, jointer, saw, jointer, along the line of forward movement of the carrier, and means for changing the position of the carrier angularly with respect to the line of movement thereof and about an axis at an angle to the plane of said parallel tracks whereby the saws and jointers are caused to form diverging surfaces on the block.

2. A machine of the character described comprising a pair of saws and a pair of jointers, a carrier for moving a wooden block in a general direction and successively presenting it to the saws and jointers, parallel tracks upon which the carrier travels, the saws and jointers being arranged in the order of saw, jointer, saw, jointer, along the line of forward movement of the carrier, and means for changing the position of the carrier angularly with respect to the line of movement thereof and about an axis at an angle to the plane of said parallel tracks between the time the block passes the first jointer and the time it passes the second saw whereby the saws and jointers are caused to form diverging surfaces on the block.

3. A machine of the character described comprising a carrier for moving a wooden block in a given general direction, parallel tracks upon which the carrier travels, a saw and a jointer on one side of the line of movement of the carrier, another saw and another jointer on the opposite side of said line of movement, the jointer being located forwardly of the saw in each instance, and means for changing the position of the carrier angularly with respect to the line of movement thereof and about an axis at an angle to the plane of said parallel tracks whereby the block is caused to engage with the saw and jointer on one side at an angle to the plane on which it engages the saw and jointer on the other side.

4. A machine of the character described comprising a carrier for moving a wooden block in a given general direction, parallel tracks upon which the carrier travels, a saw and a jointer on one side of the line of movement of the carrier, another saw and another jointer on the opposite side of said line of movement, the last mentioned saw and jointer being located forwardly of the first mentioned, the jointer being located forwardly of the saw in each instance, and means for changing the position of the carrier angularly with respect to the line of movement thereof and about an axis at an angle to the plane of said parallel tracks whereby the block is caused to engage with the saw and jointer on one side at an angle to the plane on which it engages the saw and jointer on the other side.

5. A machine of the character described comprising a carrier for moving a block in a given general direction, track means upon which the carrier is supported in a given plane, a pair of saws one on each side of said line of movement, the planes of the saws being parallel to each other, and means for causing the carrier to present the block to one of the saws to cut a desired surface thereon and for turning the block about an axis at right angles to the plane in which it is supported by the track means and presenting it to the other saw to cut another surface thereon the plane of which intersects the plane of the first mentioned surface at an acute angle.

6. A machine of the character described comprising a carrier for moving a block in a given general direction, parallel tracks on which the carrier travels, a pair of rotatable tools one disposed forwardly of the other along the line of movement of the carrier, the axes about which the tools rotate being parallel to each other, and means for causing the carrier to present the block to one of the tools to cut a desired surface thereon and for shifting it about an axis at an angle to the plane of the tracks and presenting it to the other tool to cut another surface thereon the plane of which intersects the plane of the first mentioned surface at an acute angle.

7. A machine of the character described comprising a carrier for moving a block in a given general direction, a track on which said carrier travels, a pair of saws one being on each side of said line of movement, the planes of the saws being parallel to each other, a pair of jointers one being on each side of said line of movement, said jointers being disposed forwardly of the corresponding saw in each instance, and means for shifting the carrier about an axis at an angle to the plane of the track and presenting the block to the saws and jointers in such manner that the planes of the surfaces cut on the block by the members of the pairs of saws and jointers intersect each other at an acute angle.

8. A machine of the character described comprising a carrier for moving a block, parallel tracks on which the carrier is supported, a pair of parallel saws one being on each side of the line of movement of the carrier, a pair of jointers one on each side of said line of movement, said jointers being disposed forwardly of the corresponding saw in each instance, and means for causing the carrier to present the block to one saw and one jointer in such manner that a desired surface having tenons and grooves cut thereon is formed and for swinging it about an axis at an angle to the plane of the tracks to present it to the other saw and jointer in such manner that a surface having grooves and tenons, corresponding respectively to the tenons and grooves of the first mentioned surface, is formed, whereby gluing surfaces are provided for joining the block to a similar block.

9. A machine of the character described comprising a carrier for moving a block, track means for supporting the carrier in a given plane, a pair of parallel saws and a pair of jointers, said jointers being disposed forwardly of the corresponding saw in each instance, and means for causing the carrier to present the block to one saw and one jointer in such manner that a desired surface having tenons and grooves cut thereon is formed and for swinging it about an axis at an angle to the plane in which the carrier is held by the track means to present it to the other saw and jointer in such manner that a surface having grooves and tenons, corresponding respectively to the tenons and grooves of the first mentioned surface, is formed, whereby gluing surfaces are provided for joining the block to a similar block.

10. A machine of the character described comprising a track, a carrier base movable on said track, a clamp base pivoted to swing theron, a clamp jaw for clamping a wooden block to the base, said jaw being pivoted to swing in respect to the clamp base, a cutting tool past which the track extends, and a resiliently supported pressure plate with which the clamp jaw engages as the carrier passes the cutting tool whereby the clamp jaw is held closed upon the block to allow a proper operation of the cutting tool thereon.

11. A machine of the character described comprising a track, a carrier base movable on the track, a clamp pivoted to swing on the base about an axis at substantially right angles to plane of the track, said clamp being adapted to hold a wooden block, means for limiting the swinging movement of the clamp, a cutting tool disposed along the path of the carrier, and means including a resilient element whereby the clamp is held at one limit of its swinging movement as the carrier passes the cutting tool.

12. A machine of the character described comprising a track, a carrier base movable on the track, a clamp pivoted to swing on the base about an axis at an angle to the plane of the track, said clamp being adapted to hold a wooden block, a pair of jointers disposed along the track, one of the jointers being forward of the other, means for limiting the swinging movement of the clamp in both directions, means for resiliently holding the clamp at one limit of movement as it passes one jointer, and means for reversing the position of the clamp and for thereafter resiliently holding it at the other limit of its movement as it passes the other jointer, whereby the block is grooved by the jointers in two general planes that lie at an angle to each other.

13. A machine of the character described comprising a track, a carrier base movable on the track, a clamp pivoted to swing on the base about an axis at an angle to the plane of the track, said clamp being adapted to hold a wooden block, a pair of jointers disposed along the track, one of the jointers being forward of the other, adjustable means for limiting the swinging movement of the clamp in both directions, means whereby the clamp is held at one limit of its movement as it passes one jointer and is then reversed and held at the other limit of its movement as it passes the other jointer, whereby the block is grooved by the jointers in two general planes that lie at an angle to each other.

14. A machine of the character described comprising a carrier for a block, parallel force-applying members for moving the carrier, a pair of rotatable tools one disposed forwardly of the other along the line of movement of the carrier, the axes about which the tools rotate being parallel to each other, and means for causing the carrier to present the block to one of the tools to cut a desired surface thereon and for shifting it about an axis at an angle to the plane of the force-applying members and presenting it to the other tool to cut another surface thereon, the plane of which intersects the plane of the first mentioned surface at an acute angle.

15. A machine of the character described comprising a pair of saws, a pair of jointers, the cutters of one of the jointers being the reverse from those of the other, and means adapted to receive a block that is curved in the arc of a circle and for carrying said block in a given general direction, and means for causing said carrying means to present the block to the saws and jointers in such manner that they form grooved surfaces in two intersecting planes, said planes passing through the center of the circle on which the block is curved and being inclined in the direction of movement of the carrier.

16. A machine of the character described comprising a pair of jointers, the cutters of one of the jointers being the reverse from those of the other, and means adapted to receive a block and for carrying said block in a given general direction, and means for causing said carrying means to present the block to the saws and jointers in such manner that they form grooved surfaces in two intersecting planes, said planes intersecting each other in a line forward of the block itself and being inclined in the direction of movement of the carrier.

In testimony whereof I sign this specification.

EDWARD J. LOBDELL.

Copies of this patent may be obtained for five cents each, by addressing the "Commissioner of Patents, Washington, D. C."